United States Patent [19]

Kasahara

[11] Patent Number: 5,764,432
[45] Date of Patent: Jun. 9, 1998

[54] RECORDING AND REPRODUCING HEAD SLIDER AND RECORDING AND REPRODUCING APPARATUS USING SAME

[75] Inventor: Akihiro Kasahara, Sanbu-gun, Japan

[73] Assignee: Kabushiki Kaisha Toshiba, Kawasaki, Japan

[21] Appl. No.: 591,003

[22] Filed: Jan. 24, 1996

[30] Foreign Application Priority Data

Jan. 24, 1995 [JP] Japan .................. 7-009254

[51] Int. Cl.$^6$ .................................................. G11B 21/21
[52] U.S. Cl. ................................................ 360/75; 360/103
[58] Field of Search ........................................ 360/75, 103

[56] References Cited

U.S. PATENT DOCUMENTS

| | | | |
|---|---|---|---|
| 4,605,977 | 8/1986 | Matthews | 360/103 |
| 4,669,011 | 5/1987 | Lemke | 360/75 X |
| 5,021,906 | 6/1991 | Chang et al. | 360/103 |
| 5,408,373 | 4/1995 | Bajorek et al. | 360/126 X |

FOREIGN PATENT DOCUMENTS

| | | | |
|---|---|---|---|
| 60-136073 | 7/1985 | Japan | 360/75 C |
| 61-113117 | 5/1986 | Japan | 360/75 C |
| 61-202384 | 9/1986 | Japan | 360/75 C |
| 1-224983 | 9/1989 | Japan | 360/75 C |
| 4-178980 | 6/1992 | Japan | 360/75 C |
| 4-205979 | 6/1992 | Japan | 360/75 C |
| 4-325949 | 11/1992 | Japan | 360/75 C |
| 5-74090 | 3/1993 | Japan . | |
| 6-187626 | 7/1994 | Japan | 360/103 |

*Primary Examiner*—Stuart S. Levy
*Assistant Examiner*—James L. Habermehl
*Attorney, Agent, or Firm*—Foley & Lardner

[57] ABSTRACT

A recording/reproducing head slider has a recording/reproducing head for recording/reproducing data in and from a date recording medium. The head slider is installed in a recording/reproducing apparatus. A first slider is floated by a hydrodynamic force generated by the medium while rotating. A second slider is elastically supported by the first slider so as to be displaced in a plane direction of the medium, the head being mounted on the second slider. A force generating means, such as an electrode, is provided as facing the second slider via a gap, for generating a repellent force between the force generating means and the second slider. A distance of the gap is varied by applying a voltage to the force generating means in response to electrostatic capacity of the gap. The first slider may have two slider rails provided parallel to each other. A plate is fixed on the two rails so that the two rails are situated in a same plane with respect to the medium. The second slider is connected to the first slider by means of a connecting portion so that the second slider is elastically supported by the first slider. A counterweight may be provided on a side opposite to the second slider with respect to the connecting portion so that a gravity center of a sum total mass of the second slider and the counterweight is located on the connecting portion.

10 Claims, 14 Drawing Sheets

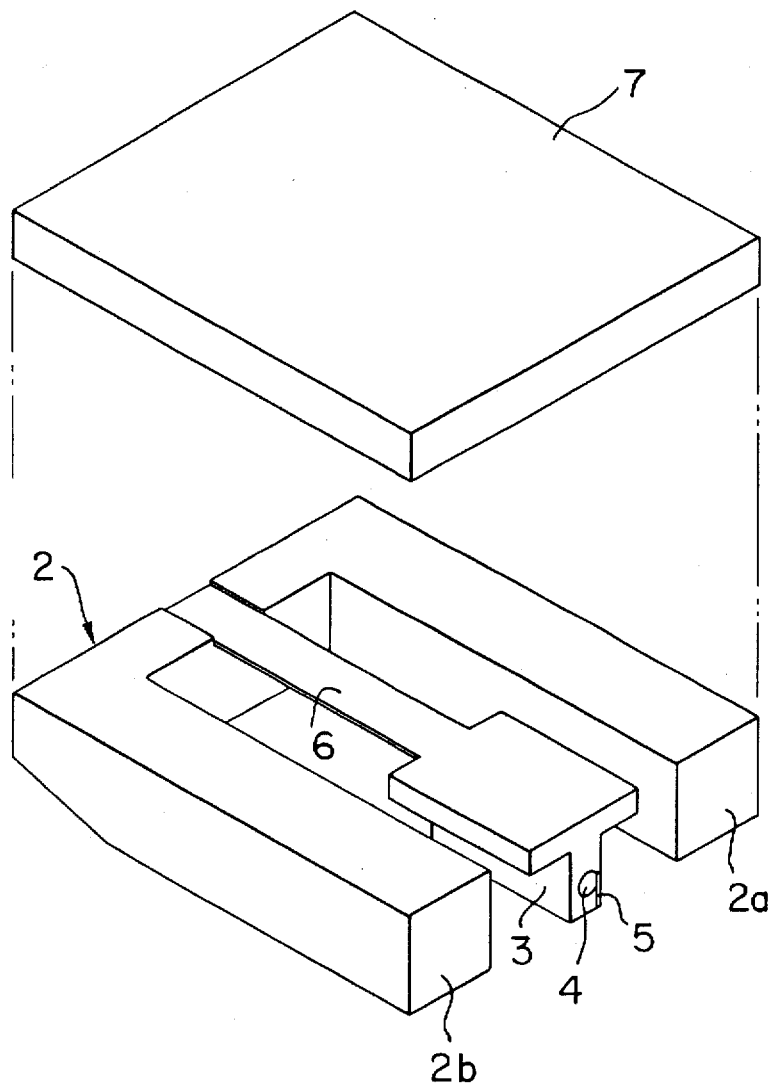
F I G. 7

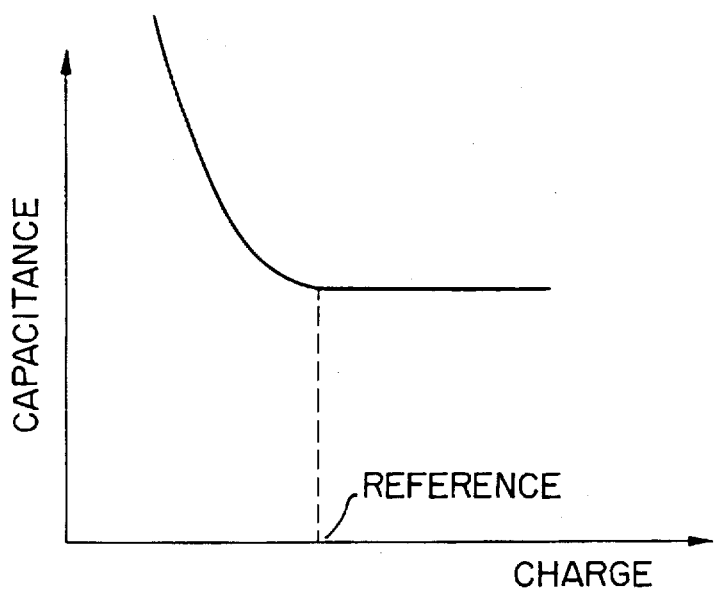
F I G. 9
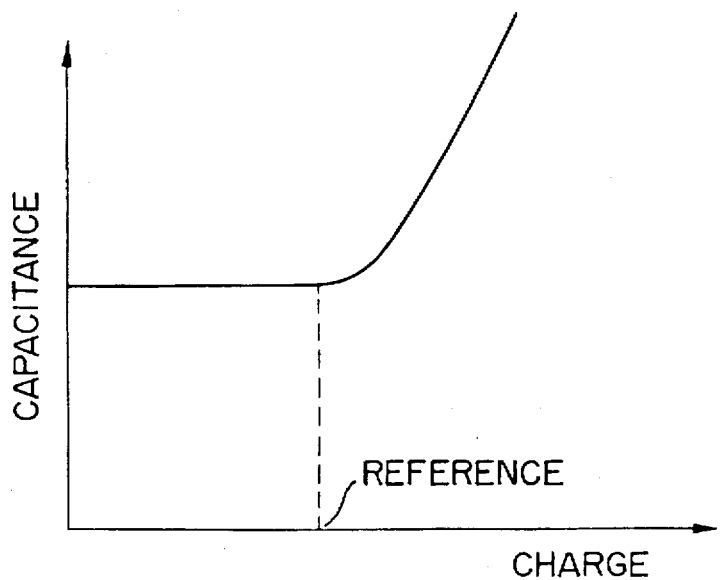
F I G. 10

RECORDING AND REPRODUCING HEAD SLIDER AND RECORDING AND REPRODUCING APPARATUS USING SAME

BACKGROUND OF THE INVENTION

1. Field of the Invention

The present invention relates to a recording and reproducing head slider used to record and reproduce data in and from a data recording medium such as a magnetic disk, and a recording and reproducing apparatus provided with the recording and reproducing head slider.

2. Description of the Prior Art

In the field of recording and reproducing apparatus, the technique for increasing the recording density of the data recording medium has been developed energetically. In the case of the magnetic disk apparatus used as one of the recording and reproducing apparatus, for instance, there exists such a tendency that a spacing (floating gap) between the magnetic disk (i.e., data recording medium) and the magnetic head (i.e., the recording and reproducing head) is narrowed more and more with the increase of the recording density. Further, in the future, it is considered that there exists a high possibility that date can be recorded and reproduced in and from the data recording medium under a condition that the magnetic disk and the magnetic head are in contact with each other. In the case where data are recorded and reproduced under the contact condition between the magnetic disk and the magnetic head, the most important problem to be solved is to reduce the wear or abrasion between the magnetic disk and head. To reduce the wear between the two, it is indispensable to hold the contact condition between the magnetic disk and the magnetic head under a stable low load.

Some examples of methods of stably maintaining the contact condition between the magnetic disk and the magnetic head are disclosed in Japanese Patent Laid-Open Nos. 62(1987)-20125 and 5(1993)-74090, for instance. These prior art methods will be described hereinbelow with reference to FIGS. 1 to 3.

In FIG. 1, a magnetic disk 24 is being rotated in an arrow direction X, a magnetic head slider 100 is kept floated over the magnetic disk 24 with a minute gap therebetween due to hydrodynamic function between the two. In more detail, as shown in FIG. 2, the magnetic head slider 100 is formed with two sliders 22a and 22b of the same shape on the side facing the magnetic disk 24. Further, as shown in FIG. 1, a symbol fh designates a hydrodynamic force generated by the above-mentioned hydrodynamic function.

Further, as shown in FIG. 1, a recording and reproducing head 20 for converting electric signals into magnetic signals corresponding thereto or vice versa (to record and reproduce data in and from the magnetic disk 24) is disposed at a rear end portion (the air flow outgoing end) of the slider 22a. Further, a contact end 21 for supplying a magnetic flux to the magnetic disk 24 is disposed extending toward the upper surface of the recording and reproducing head 20. During the data recording and reproduction, the contact end 21 is brought into contact with the magnetic disk 24, so that a contact force fc is applied to the slider 22a. In the same way, another similar contact force fc is applied to the rear end of the slider 22b. Therefore, since the same hydrodynamic force fh and the same contact force fc are applied to the two sliders 22a and 22b, it is possible to maintain the balance of the magnetic head slider 100 in the right and left direction.

In order to balance the magnetic head slider 100 in the front and rear direction in FIG. 1, a push force F is applied from a suspension (not shown) to an upper central position of the magnetic head slider 100. The direction of this push force F is opposite to those of the hydrodynamic force fh and the contact force fc applied to the two sliders 22a and 22b from below. The push force F is applied to the magnetic head sliders 22a and 22b via a pivot 23 formed on the suspension as a projection located by a distance Ip away from the contact end 21.

Here, the pressure generated between the magnetic disk 24 and the sliders 22a and 22b due to the hydrodynamic function distributes as shown by a reference numeral 25 in FIG. 1. As shown, a large pressure peak exists on the front end side of the sliders 22a and 22b and a small pressure peak exists on their rear end side. In this distribution pressure 25, the pressure center 26 (equivalent to a position where a unit hydrodynamic force fh is applied) exists a position by a distance Ih away from the contact end 21.

Further, as understood by FIG. 2, since the magnetic head slider 100 is of symmetrical shape with respect to the right and left direction (in the vertical direction in FIG. 2) it is possible to represent the distributed pressure in a two dimensional way as shown in FIG. 1, that is, the pressure is uniform in the direction perpendicular to the paper.

As described above, in the state where the magnetic head slider 100 is kept floated, the forces and moments of the three forces (i.e., the hydrodynamic force fh, the contact force fc and the push force F) are well balanced as follows:

$$fc = \{(Ih-Ip)/Ih\} \times F \quad (1)$$

Under the construction as described above, as far as the pressure center 26 of the hydrodynamic force fh does not vary, the magnetic head slider 100 can stably follow the magnetic disk 24 without being disturbed by the external disturbance such as vibration and unevenness of the magnetic disk 24. Under these conditions, it is possible to stably maintain the positional relationship between the contact end 21 and the magnetic disk 24 and thereby to minimize the flux fluctuations supplied from the contact end 21 to the magnetic disk 24.

In the prior art magnetic head slider, however, when the magnetic head slider 100 is moved in the radial direction of the magnetic disk 24 for recording and reproduction operation, the position Ih of the pressure center 26 varies due to the variation of the relative speed between the two. As a result, the contact force fc fluctuates according to the radial position of the magnetic disk 24 at which the magnetic disk slider 100 is placed on the magnetic disk 24, so that the recording and reproducing apparatus is not well stabilized.

Further, as shown in FIG. 3, a gravity center decided by an equivalent mass of the suspension at the position of the pivot 23 and a mass distribution of the magnetic head slider 100 lies between the position of the pivot 23 and a gravity center G of the magnetic head slider 100 itself. In FIG. 3, Ig denotes a distance between the gravity center G of the magnetic head slider 100 and the contact end 21. Here, when the vibration of the magnetic disk 24 and the fluctuations in the contact force fc due to an inertial force (e.g., a shock) applied to the apparatus are taken into account, an inertial force fg generated by the external vibration is applied to the gravity center G. Here, since the applied inertial force fg is balanced by the two forces of a fluctuation rate Δfc of the contact force fc and a fluctuation rate Δfh of the aerial force fh, the following expression can be established on the basis of the positional relationship of the applied forces.

$$\Delta fc = \{(Ih-Ig)/Ih\} \times fg \quad (2)$$

In any of the two prior art apparatus as disclosed in Japanese Patent Laid-Open Nos. 62-20125 and 5-74090, (Ih−Ig)/Ih is 0.2 or more. This indicates that 20% or more of the inertial force fg generated by external vibration is applied as the fluctuation rate Δfc of the contact force fc. The above-mentioned fluctuation rate Δfc is a serious problem when a contact force between the magnetic disk 24 and the magnetic head slider 100 must be reduced for prevention of abrasion between the disk and head slider.

As described above, in the prior art apparatus, when the magnetic head slider is moved along the radial direction of the magnetic disk or when the inertial force fluctuates by the vibration of the magnetic disk or by a shock applied to the apparatus, since the contact force between the magnetic disk and the magnetic head fluctuates, there exists a problem in that the recording and reproducing apparatus is not stabilized.

SUMMARY OF THE INVENTION

With these problems in mind, therefore, it is the object of the present invention to provide a recording and reproducing head slider which can control the contact force between the data recording medium (i.e., magnetic disk) and the recording and reproducing head slider (i.e., magnetic head) to stabilize a contact status between the two, and further to provide the recording and reproducing apparatus using the sane head slider.

To achieve the above-mentioned object, the present invention provides a recording and reproducing head slider having a recording and reproducing head for recording and reproducing data in and from a data recording medium, comprising: a first slider floated by a hydrodynamic force generated by the data recording medium while rotating; a second slider elastically supported by the first slider so as to be displaced in a plane direction of the data recording medium, the recording and reproducing head being mounted on the second slider; force generating means, provided facing the second slider via a gap, for generating a repellent force between the force generating means and the second slider; and voltage application means for applying a voltage to the force generating means to vary a distance of the gap.

Further, the present invention provides a recording and reproducing apparatus for recording and reproducing data in and from a data recording medium, comprising: a first slider floated by a hydrodynamic force generated by the data recording medium while rotating; a second slider elastically supported by the first slider so as to be displaced in a plane direction of the data recording medium; a recording and reproducing head mounted on the second slider; drive means for driving the first and second sliders so that the recording and reproducing head is floated over the data recording medium; force generating means, provided as facing the second slider via a gap, for generating a repellent force between the force generating means and the second slider; and voltage applying means for applying a voltage to the force generating means to vary a distance of the gap.

In the above recording and reproducing head slider and the recording and reproducing apparatus, the voltage applying means may include means for measuring an electrostatic capacity of the gap, and means, responsive to the electrostatic capacity, for varying the distance of the gap.

Further, in the above head slider and apparatus, the first slider may have two slider rails provided parallel to each other. Further, a plate may be fixed on the two rails so that the two rails are situated in a same plane with respect to the data recording medium.

Further, the above head slider and apparatus may include a connecting portion for connecting the second slider to the first slider so that the second slider is elastically supported by the first slider.

Further, the above head slider and apparatus may include a counter weight provided on a side opposite to the second slider with respect to the connecting portion so that a gravity center of a sum total mass of the second slider and counterweight is located on the connecting portion.

Further, the present invention provides a control method of a recording and reproducing apparatus having a recording and reproducing head slider, comprising the steps of: controlling the recording and reproducing head slider so that the head slider touches a data recording medium in a recording or reproducing mode; and controlling the recording and reproducing head slider so that the head slider does not touch the data recording medium in a mode, except the recording or reproducing mode.

BRIEF DESCRIPTION OF THE DRAWINGS

FIG. 7 is a perspective view showing the first embodiment of the recording and reproducing head slider according to the present invention;

FIG. 9 is a graphical representation showing the change of electrostatic capacity with respect to a voltage applied to the electrode;

FIG. 10 is another graphical representation showing the change of electrostatic capacity with respect to a voltage applied to the electrode;

DETAILED DESCRIPTION OF THE EMBODIMENTS

Figure 1:
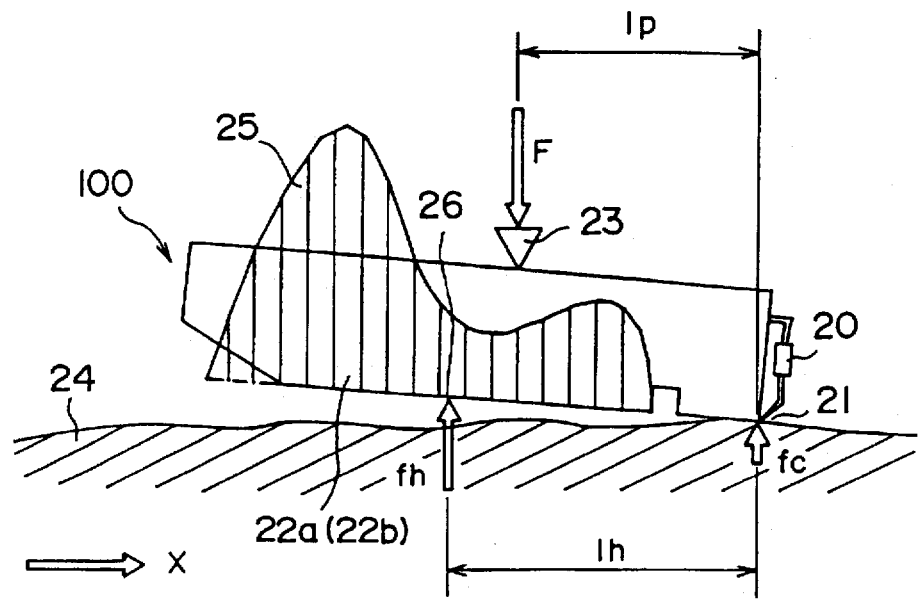
FIG. 1 is a cross-sectional view showing the prior art recording and reproducing head slider, for assistance in explaining the balancing of forces and moments applied thereto.
Figure 2:
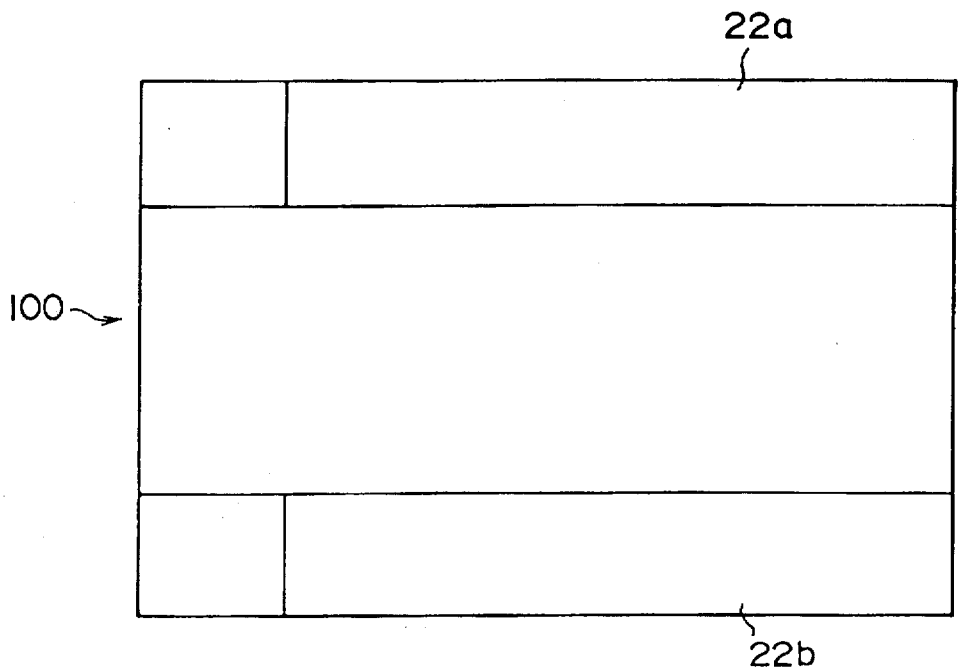
FIG. 2 is a back view showing the prior art recording and reproducing head slider.
Figure 3:
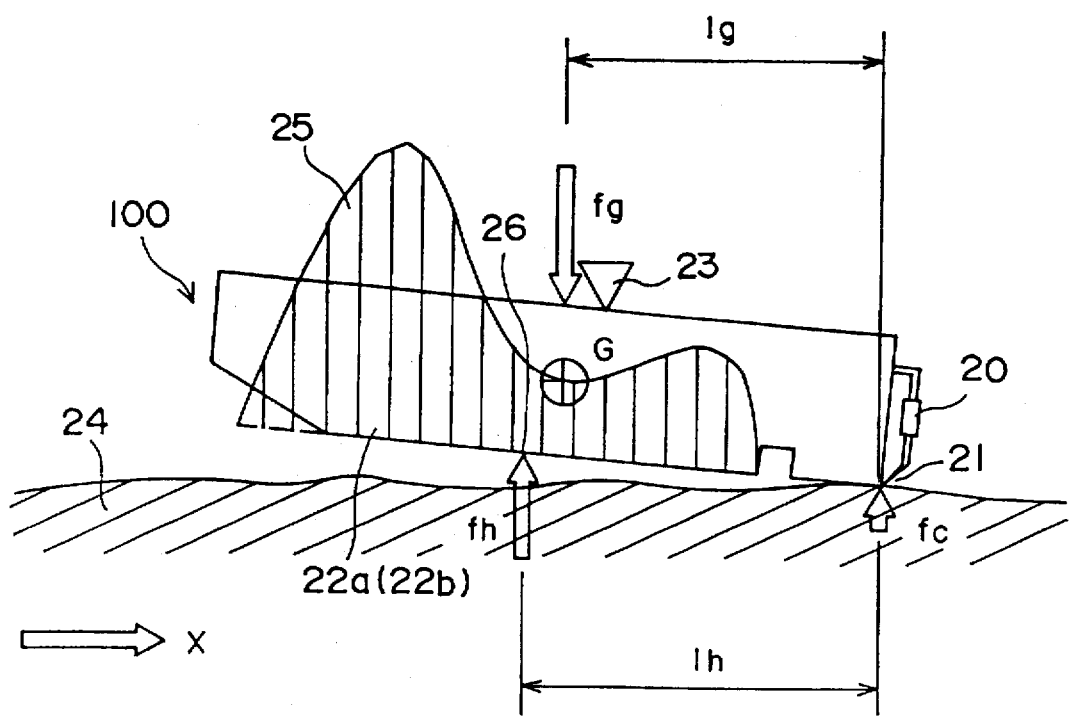
FIG. 3 is a cross-sectional view showing the prior art recording and reproducing head slider, for assistance in explaining the balancing of an inertial force, a contact force, and a hydrodynamic force applied thereto.

Preferred embodiments of the present invention will be described hereinbelow with reference to the attached drawings. Further, in the following embodiments, a magnetic head slider is explained as an example of the recording and reproducing head slider, and the magnetic disk apparatus is explained as the recording and reproducing disk apparatus.

First, a magnetic disk apparatus to which the magnetic head slider according to the present invention is applied will be described with reference to FIG. 4.

A magnetic disk (recording medium) 101 in and from which data are recorded and reproduced is formed of a hard material and into a disk shape. The magnetic disk 101 is mounted on a spindle motor 102 and rotated at a constant rotational speed by the motor. A magnetic head slider 1 is floated on the magnetic disk 101 with a minute gap away from the disk 101. Here, the magnetic head slider 1 is mounted on an end of a suspension 104 formed of a metallic thin plate. Further, on the magnetic head slider 1, a magnetic head (not shown) is mounted for recording and reproducing data.

The suspension 104 is fixed to an end of an arm 105 formed of a metal or a resin. On the other end of the arm 105, a coil bobbin (not shown) is attached, and a drive coil (also not shown) wound into a flat shape is fixed to this coil bobbin. Further, a magnetic circuit 106 composed of a permanent magnet and a york is disposed in such a way that the drive coil is interposed between the permanent magnet and york in the vertical direction. The magnetic circuit 106 and the drive coil constitute a voice coil motor. Accordingly, the arm 105 can be rotated or driven around a rotational axle 107 by a Lorentz's force generated by the magnetic flux of the magnetic circuit 106 and current flowing through the drive coil.

Here, the location of the magnetic head on the magnetic disk 101 is executed by a location servo-system which reads servo data written in the magnetic disk 101 and then feedbacks the read servo data to the voice coil motor. That is, data can be recorded or reproduced in and from the magnetic disk 101, by adjusting current to be supplied to the drive coil through the location servo-system so that the position of the magnetic head can be controlled.

Respective composing elements required for the above operation are housed in a casing 108, together with electric parts (e.g., semiconductor devices) required for the location servo-system. In addition, the magnetic disk apparatus is covered with a cover 109 formed of a metallic thin plate from above, so that the magnetic disk apparatus is constructed as an air-tightly closed structure.

The magnetic disk apparatus constructed as described above can be coupled to a computer body (not shown) electrically via a terminal group 110 projecting to the outside from the casing 108.

Figure 5:
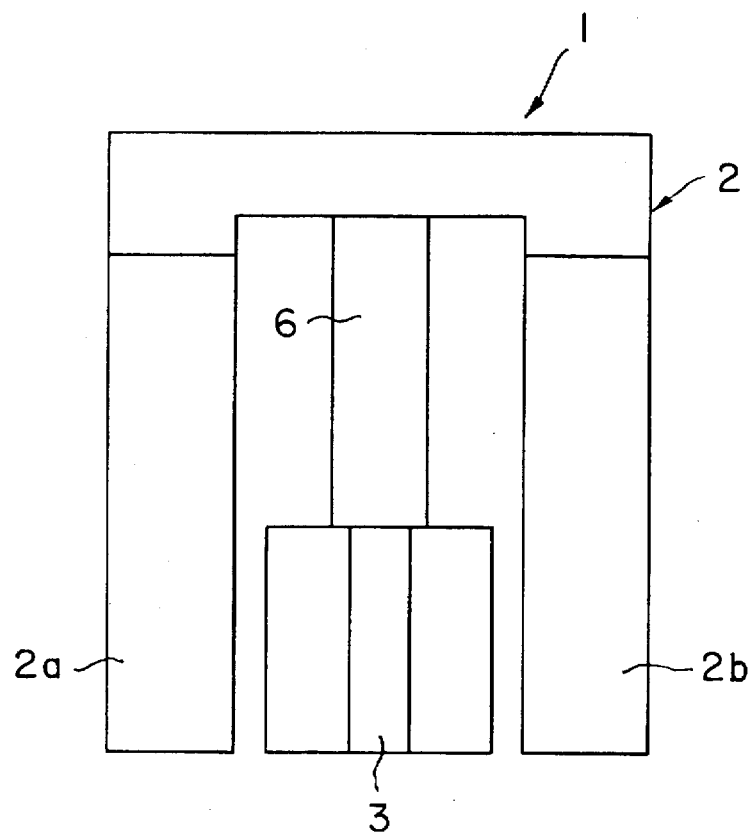
FIG. 5 is a back view showing a first embodiment of the recording and reproducing head slider according to the present invention.

A first embodiment of the magnetic head slider 1 will be described hereinbelow with reference to FIGS. 5 to 7.

The magnetic head slider 1 is provided with a main slider 2, a connecting beam 6, and a subsidiary slider 3. The main slider 2 is formed into roughly U-shape by two tapered flat sledge-shaped rods. The connecting beam 6 is formed as being flexible by a fairly thin plate as compared with that of the main slider 2, and connected to a central portion of the main slider 2 so as to extend to an air flow outgoing end. The subsidiary slider 3 is connected to a free end of the connecting beam 6.

In more detail, the main slider 2 is provided with two right and left main sliders, or rails, 2a and 2b of the same shape and area. The connecting beam 6 is formed in such a shape that its horizontal length (in the plane direction of a magnetic disk) is sufficiently longer than its vertical length (in thickness direction) so as to be easily deformed (i.e., bent) by a moment applied in the vertical direction but not easily deformed by a moment applied in the horizontal direction. The subsidiary slider 3 is formed roughly into a T-shape in such a way that its gravity center is located on an extension line of the connecting beam 6. As shown in FIGS. 6 and 7, a recording and reproducing head 4 and a contact and 5 are arranged in the vicinity of the rear (right side) and of the slider surface of the subsidiary slider 3. Further, the length and the width of the subsidiary slider 3 are both determined a half or less of the length and width of the main slider 2, respectively. Therefore, the area of the subsidiary slider 3 is about ¼ or less of that of the main slider 2. Further, the subsidiary slider 3 is so connected to the connecting beam 6 in such a way that the gravity center of the subsidiary slider 3 is located on an extension line of the connecting beam 6.

The main slider 2, the subsidiary slider 3 and the connecting beam 6 are all formed integral with each other by processing a silicon wafer through anisotropic etching, for instance. Further, the recording and reproducing head 4 are formed on the subsidiary slider 3 by deposition processing and etching processing.

Figure 6:
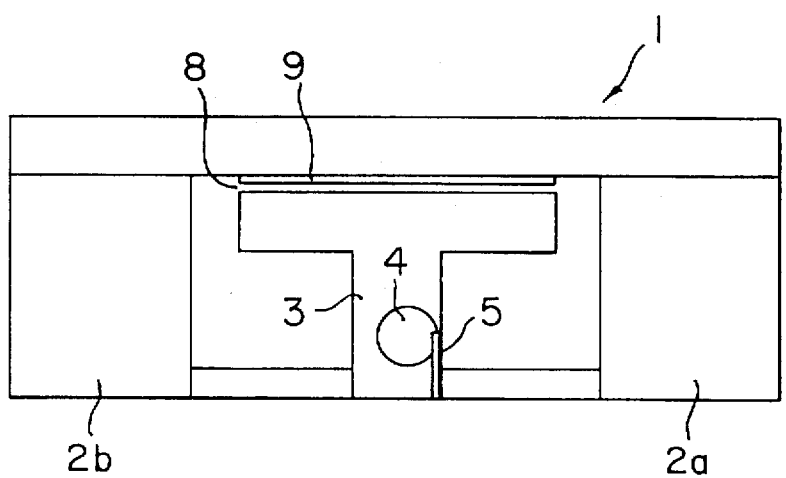
FIG. 6 is a cross-sectional view showing the first embodiment of the recording and reproducing head slider according to the present invention.

In addition, as shown in FIGS. 6 and 7, a reinforcing plate 7 is mounted on the upper side of the magnetic head slider 1 by means of diffusion junction. The reinforcing cover 7 is formed of glass, and used to keep flat both the first and second main sliders 2a and 2b for constituting the main slider 2 on the same plane (i.e., without being twisted relative to each other). The shape of the reinforcing plate 7 is of rectangular shape so formed as to just cover the upper surface of the magnetic head slider 1.

Further, as shown in FIG. 6, between the reinforcing plate 7 and the subsidiary slide 3, an air gap 8 is formed in parallel to a magnetic disk. An electrode 9 is attached to the lower (air gap side) surface of the reinforcing plate 7 so as to be interposed within this air gap 8.

Further, on the upper surface of the magnetic head slider 1, a wiring pattern (not shown) is formed from the air flow incoming end of the main slider 2, through the connecting beam 6 and the subsidiary slider 3, to the recording and reproducing head 4, by depositing or etching aluminum thereon.

On the lower side of a suspension facing the magnetic head slider 1, another wiring pattern (not shown) is formed in correspondence to the wiring pattern formed on the upper surface of the magnetic head slider 1. Both the two wiring patterns are connected to each other at the air flow incoming end of the main slider 2 by contacts formed by solder or gold. Further, the wiring pattern is connected to a recording and reproducing apparatus body through the root portion of the suspension.

Figure 8:
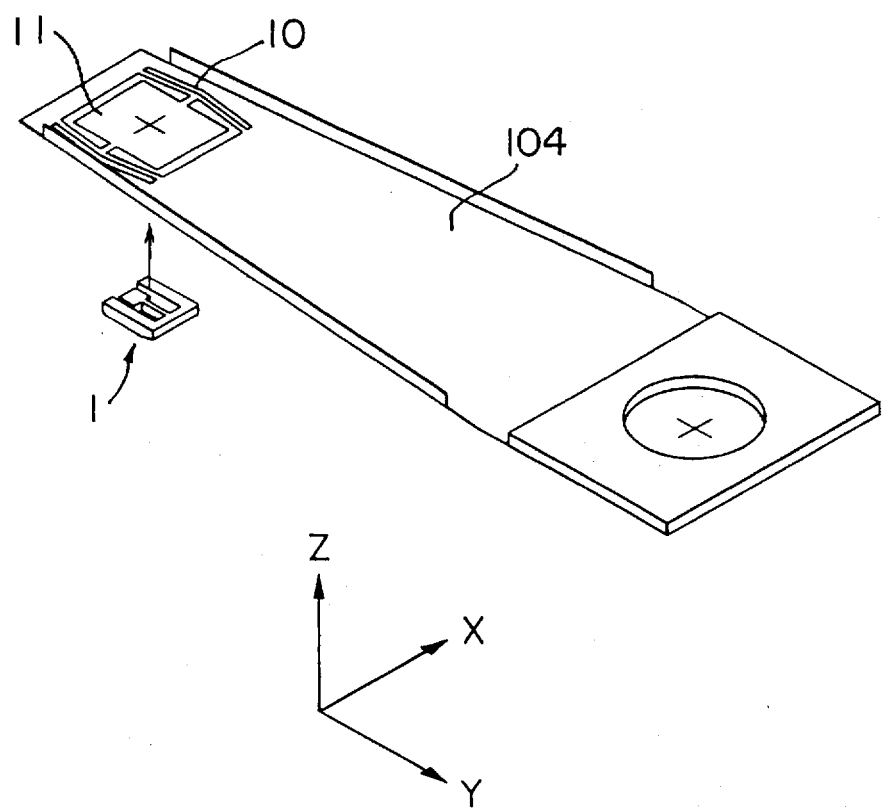
FIG. 8 is an illustration for assistance in explaining a method of mounting the recording and reproducing head slider on the suspension.

FIG. 8 shows a method of mounting the magnetic head slider 1 on a suspension 104, in which the magnetic head slider 1 is fixed to a free end of the suspension 104 by use of a bonding agent. Further, the afore-mentioned reinforcing plate 7 is interposed between the magnetic head slider 1 and the suspension 104.

Figure 4:
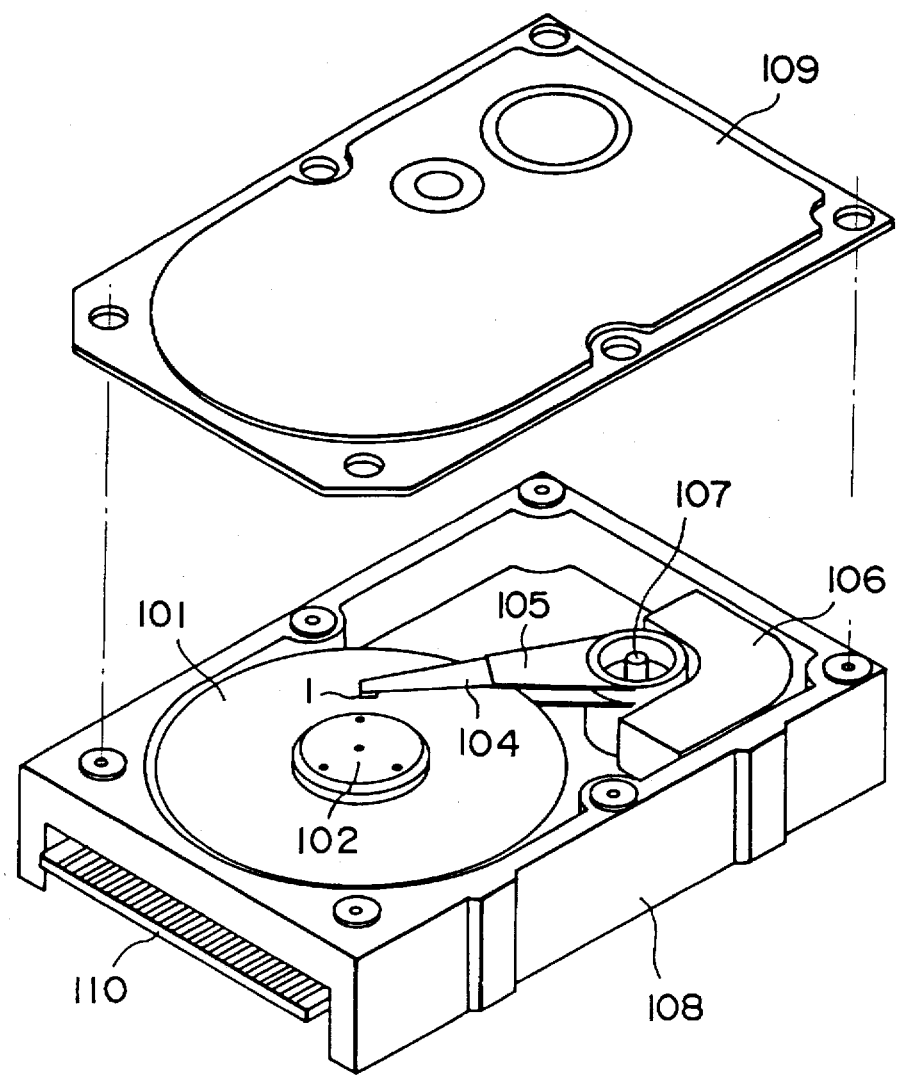
FIG. 4 is a perspective view showing an example of the magnetic disk apparatus to which the recording and reproducing head slider according to the present invention in applied.

As shown in FIG. 4, the suspension 104 is formed with two slender slits 10 so as to enclose a mounting area 11 for the magnetic head slider 1. Accordingly, the magnetic head slider 1 fixed to the mounting area 11 can be pivoted both around the X-axis and Y-axis, respectively.

Further, the space between the reinforcing plate 7 and the subsidiary slider 3, that is, the distance of the air gap 8 can be measured by the electrode 9 interposed in the air gap 8.

In more detail, when a voltage is applied to the electrode 9 to charge the electrode 9, a repellent force is generated between the reinforcing plate 7 and the subsidiary slider 3. As a result, the connecting beam 6 on which the subsidiary slider 3 is mounted is deformed elastically, and thereby the subsidiary slider 3 is moved toward and brought into contact with a magnetic disk. Here, the electrostatic capacity C formed between the electrode 9 and the subsidiary slider 3 decreases with increasing distance of the air gap 8.

FIG. 9 shows the change of the electrostatic capacity C formed between the electrode 9 and the subsidiary slider 3. FIG. 9 indicates that when the voltage applied to the electrode 9 increases and thereby the generated charge increases, since a force for urging the subsidiary slider 3 toward the magnetic disk increases, the air gap 8 increases, with the result that the electrostatic capacity C decreases. In this case, however, when the subsidiary slider 3 is brought into contact with the magnetic disk, since the air gap 8 cannot be further increased (even if the charge is more increased to increase the urging force of the subsidiary slider 3 toward the magnetic disk), the electrostatic capacity C will not change. Therefore, it is possible to monitor the contact status between the subsidiary slider 3 and the magnetic disk (i.e., between the contact end 5 and the magnetic disk) by detecting a point where the electrostatic capacity C changes no more.

Further, when the charge is increased by a constant rate from the contact status (i.e., the reference status), it is possible to obtain a predetermined contact force between the contact end 5 and the magnetic disk, so that it is possible to control the contact force between the two extremely precisely.

Further, when the charge is decreased by a constant rate from the contact status (i.e., the reference status), it is possible to form a predetermined gap between the contact end 5 and the magnetic disk, so that it is possible to control both the contact force and the gap between the two extremely precisely.

In addition, it is possible to control the contact force between the contact end 5 and the magnetic disk to zero or very close thereto by controlling the generated charge to maintain the reference status.

As described above, in the magnetic head slider according to the present invention, it is possible to obtain a practical effect such that when an external vibration is applied to the apparatus, the collision between the subsidiary slider 3 and the magnetic disk can be not only prevented, but also the contact condition and the floating condition between the contact end 5 and the magnetic disk 101 can be freely controlled at high precision without any restriction.

In the above-mentioned embodiment, the lower surface of the subsidiary slider 3 is situated at a level the same or higher than the lower surface of the main slider 2. In contrast with this, the case where the lower surface of the subsidiary slider 3 is located at a level lower than the lower surface of the main slider 2 will be explained hereinbelow.

In the above-mentioned later case, even if the main slider 2 is floated by a constant distance away from the surface of the magnetic disk, there exists a possibility that the subsidiary slider 3 is brought into contact with the magnetic disk under a slightly urged condition. Here, when a voltage is applied between the electrode 9 and the subsidiary slide 3 in such a way that the electrode 9 and the opposing position to this electrode 9 can be charged to two opposite poles, (that is, one is charged to a positive pole and the other is charged to a negative pole), a suction force is generated between the electrode 9 and the subsidiary slider 3. Therefore, the subsidiary slider 3 can be separated away from the magnetic disk. In this case, however, since the connecting beam 6 urges the subsidiary slider 3 toward the magnetic disk; that is, since the urging (elastic) force of the connecting beam 6 to the subsidiary slider 3 is opposite to that of the suction force, the contact status between the two can be maintained until a large suction force larger than this urging force is generated.

Therefore, when the voltage applied between the electrode 9 and the subsidiary slider 3 is increased to generate a suction force greater than the urging force of the connecting beam 6, the connecting beam 6 is elastically deformed, so that the subsidiary slider 3 can be moved away from the magnetic disk. Consequently, the air gap 8 is narrowed relatively, with the result that the electrostatic capacitance C formed between the electrode 9 and the subsidiary slider 3 increases, as shown in FIG. 10.

In the same way as described above, when the charge is decreased by a constant rate by setting an inflection point (indicated by a dotted line in FIG. 10) as the reference status, it is possible to apply a predetermined contact force between the contact and 5 and the magnetic disk. Further, when the charge is increased by a predetermined rate from the reference status, it is possible to generate a predetermined gap between the contact end 5 and the magnetic disk. In addition, it is also possible to approach the contact force to zero extremely without any restriction by maintaining the reference status.

In the above-mentioned case, since the portion facing the electrode 9 is charged to a pole opposite to that of the electrode 9, there exists an advantage that the electrode 9 can be easily charged.

As described above, in the magnetic head slider according to the present invention, it is possible to control the contact status or a slightly floated status between the contact end and the magnetic disk freely and extremely precisely.

Figure 11:
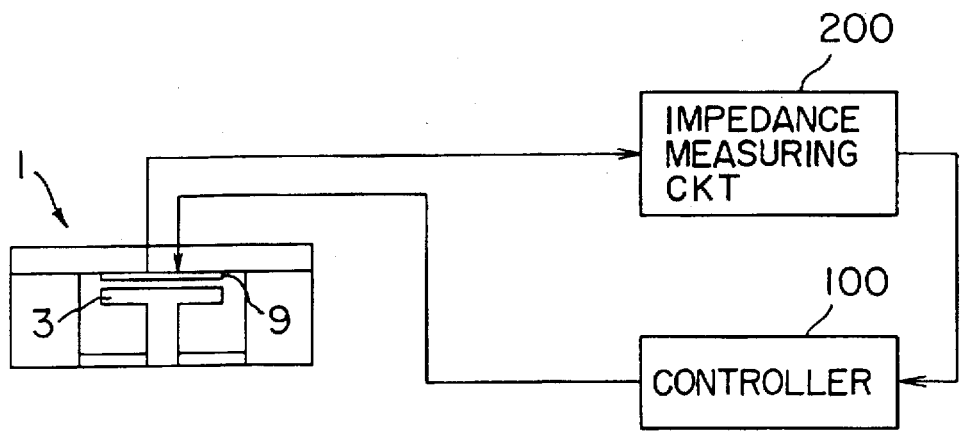
FIG. 11 is a circuit diagram of measuring electrostatic capacity.

Further, the relationship between the charge and the electrostatic capacitance as shown in FIGS. 9 and 10 are previously stored in a memory of a controller 100 shown in FIG. 11, so that the charge can be generated appropriately according to the contact force or the gap distance to be required.

In FIG. 11, the controller 100 varies the voltage applied to the electrode 9 of the magnetic head slider 1. An impedance measuring circuit 200 measures a varying electrostatic capacitance between the electrode 9 and the subsidiary slider 3. In response to the measured capacitance, the controller 100 determines whether the subsidiary slider 3 is moving. In detail, the controller 100 judges that the subsidiary slider 3 reaches the magnetic disk when the subsidiary slider 3 stops. The controller 100 then applies a voltage to the electrode 9, the voltage being corresponding to contact force stronger than that when the subsidiary slider 3 reaches the magnetic disk.

The impedance measuring circuit 200 can also measure the electrostatic capacitance by mixing an a. c. voltage with the voltage applied to the electrode 9 for moving the subsidiary slider 3. The a. c. voltage is of slight amplitude and high frequency corresponding to the situation in that the subsidiary slider 3 is almost not moving. The impedance measuring circuit 200 measures the electrostatic capacitance by means of a resonant frequency of the mixed high frequency component.

Control of the controller 100 is conducted as follows: In recording/reproducing mode, the subsidiary slider 3 is made to touch the magnetic disk to record/reproduce at least a recording/reproducing signal thereto/therefrom. On the contrary, except in the recoring/reproducing mode, such as a waiting mode, the subsidiary slider 3 is made to be floated over the magnetic disk to reproduce at least a tracking signal therefrom. In the waiting mode, other signals, except the tracking signal, may be distorted. The distorted signals, however, cause no difficulty in control.

The life of the magnetic head is thus made longer than the case in which a head slider is always made to touch a magnetic disk. Further, since at least the tracking signal is reproduced in the waiting mode, mode change from the wating to recording/reproducing mode is made rapidly. High-speed control is thus provided.

As described above, in the magnetic head slider according to the present invention, it is possible to detect the gap distance formed between the subsidiary slider and the reinforcing plate by measuring the electrostatic capacity of the electrode interposed within the gap. In addition, by controlling the voltage applied to the electrode according to the detected gap distance, it is possible to change the contact force and the gap distance between the recording and reproducing head and the date recording medium.

As a result, it is possible to realize the recording and reproducing apparatus provided with the recording and reproducing head slider, such that the contact force between the data recording medium and the recording and reproducing head can be suppressed at a small level, that is, maintained in a stable contact status by controlling the electrode voltage according to the gap distance.

Further, it is possible to consider that when the subsidiary slider 3 is brought into an extremely close vicinity of the magnetic disk, a so-called interatomic force is generated between the two surfaces of the subsidiary slider 3 and the magnetic disk. In this case, since the interatomic force generates a minute repellent force between the two surfaces in the direction that the subsidiary slider 3 and the magnetic disk are moved away from each other, it is possible to maintain the balancing condition between the two by generating a force in the direction opposite to that of the repellent (i.e., interatomic) force.

Here, it has been known that the interatomic force is about 50 mg in measurement pressure when a probe with a diameter of about 0.5 mm is used and 10 mg when a probe with a diameter of about 2 μm is used. Therefore, when a pressure of several mg is set, it is possible to not only control the gap distance and the contact force between the subsidiary slider and the magnetic disk, but also maintain an extremely minute gap between the two under a non-contact condition even if an interatomic force is generated. As a result, it is possible to control the floating condition between the subsidiary slider and the magnetic disk while preventing the abrasion between the two.

Figure 12:
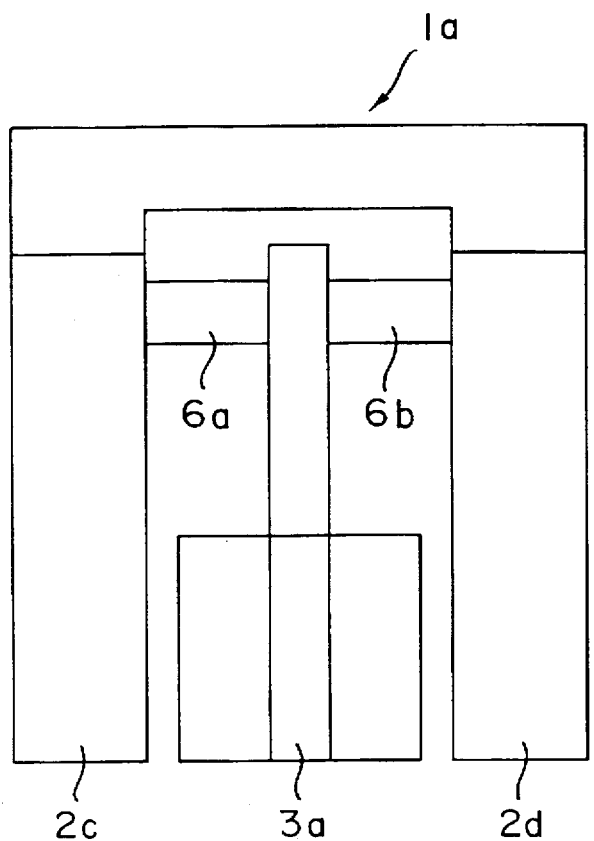
FIG. 12 is a back view showing a second embodiment of the recording and reproducing head slider according to the present invention.
Figure 13:
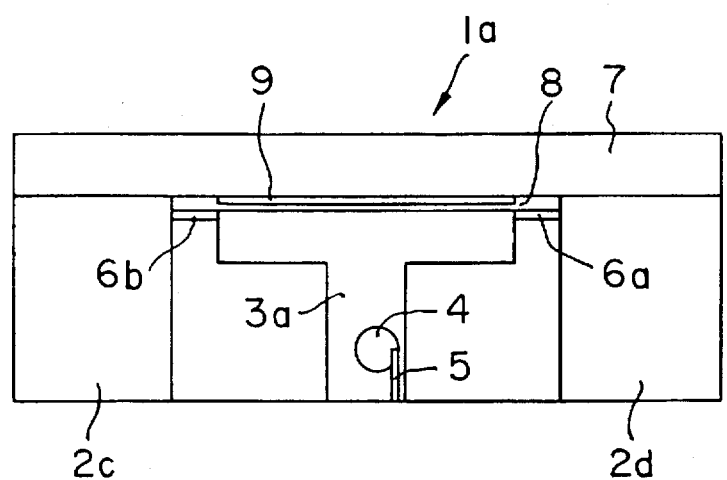
FIG. 13 is a cross-sectional view showing the second embodiment of the recording and reproducing head slider according to the present invention.
Figure 14:
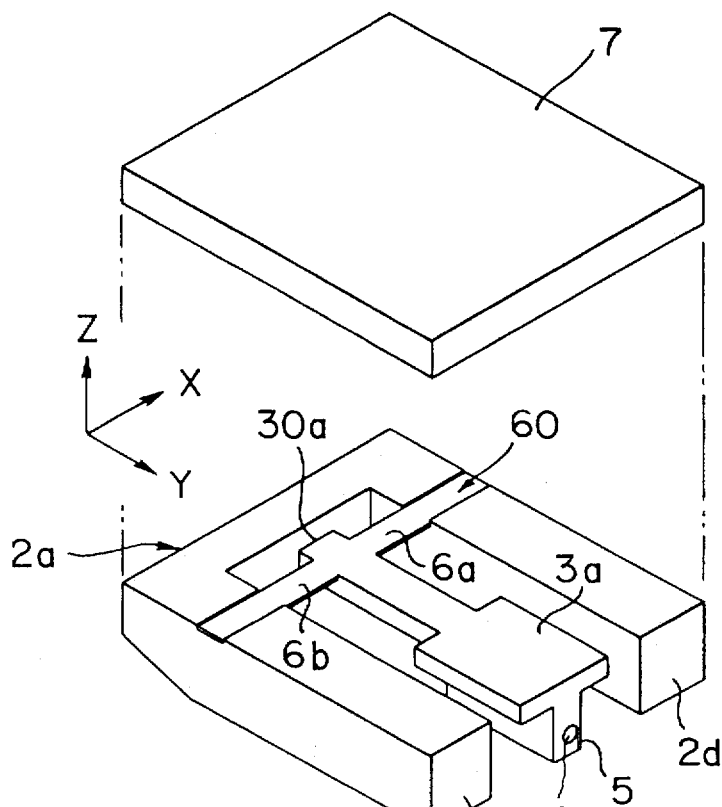
FIG. 14 is a perspective view showing the second embodiment of the recording and reproducing head slider according to the present invention.
Figure 15:
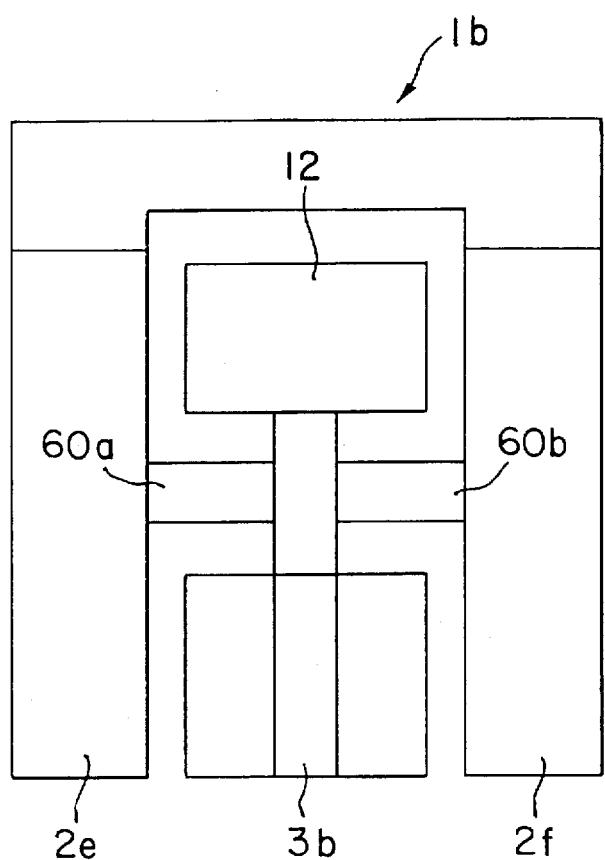
FIG. 15 is a back view showing a third embodiment of the recording and reproducing head slider according to the present invention.
Figure 16:
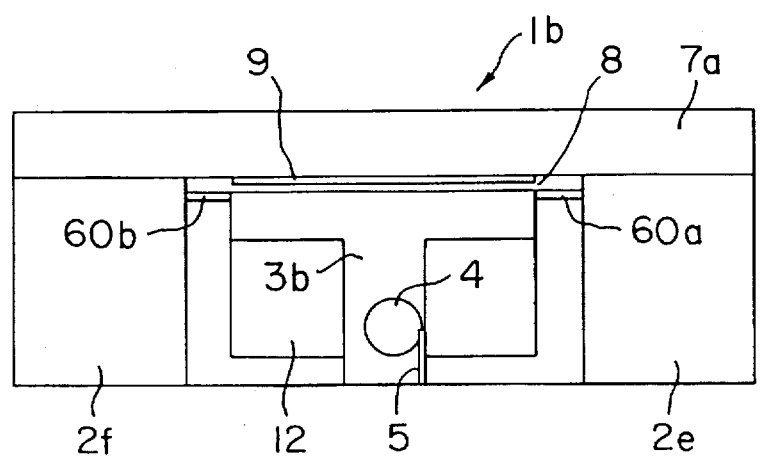
FIG. 16 is a cross-sectional view showing the third embodiment of the recording and reproducing head slider according to the present invention.

A second embodiment of the magnetic head slider according to the present invention will be described hereinbelow with reference to FIGS. 12 to 14. The same reference numerals have been retained for the similar elements or parts having the same functions as with the case of the first embodiment.

The second embodiment is different from the first embodiment in the shape of a connecting beam 60. In more detail, in the case of the first embodiment, the connecting beam 6 is disposed so as to extend in a direction parallel to the movement direction (air flow direction) of the magnetic disk. In contrast with this, in the case of the second embodiment, the connecting beam 60 is disposed so as to extend in a direction perpendicular to the movement direction (air flow direction) of the magnetic disk. In other words, in this second embodiment, a subsidiary slider 3a is formed in such a way that an end portion 30a thereof extends toward the air flow incoming end in the Y-axis direction, and further two connecting beams 6a and 6b are formed in such a way that they extend from the same end portion 30a to both main sliders 2c and 2d in the X-axis direction.

The construction of the second embodiment provides the following effect in addition to that obtained in the first embodiment: since the two connecting beams 6a and 6b are supported on both sides thereof in the X-axis direction, the subsidiary slider 3a is not easily deformed around the Y-axis, so that it is possible to obtain an excellent head touch between the contact end 5 and the magnetic disk.

A third embodiment of the magnetic head slider according to the present invention will be described hereinbelow with reference to FIGS. 15 to 18.

The third embodiment is different from the second embodiment in that a counter weight 12 is additionally provided on the side opposite to a subsidiary slider 3b with respect to connecting beams 60a and 60b in such a way that the gravity center of the sum total mass of the subsidiary slider 3b and the counter weight 12 is located at roughly the same position as the connection position of the connecting beams 60a and 60b.

Figure 17:
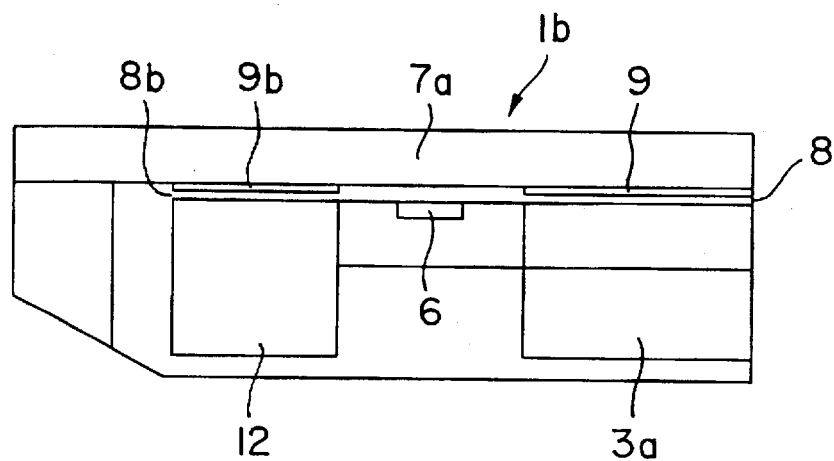
FIG. 17 is another cross-sectional view showing the third embodiment of the recording and reproducing head slider according to the present invention.
Figure 18:
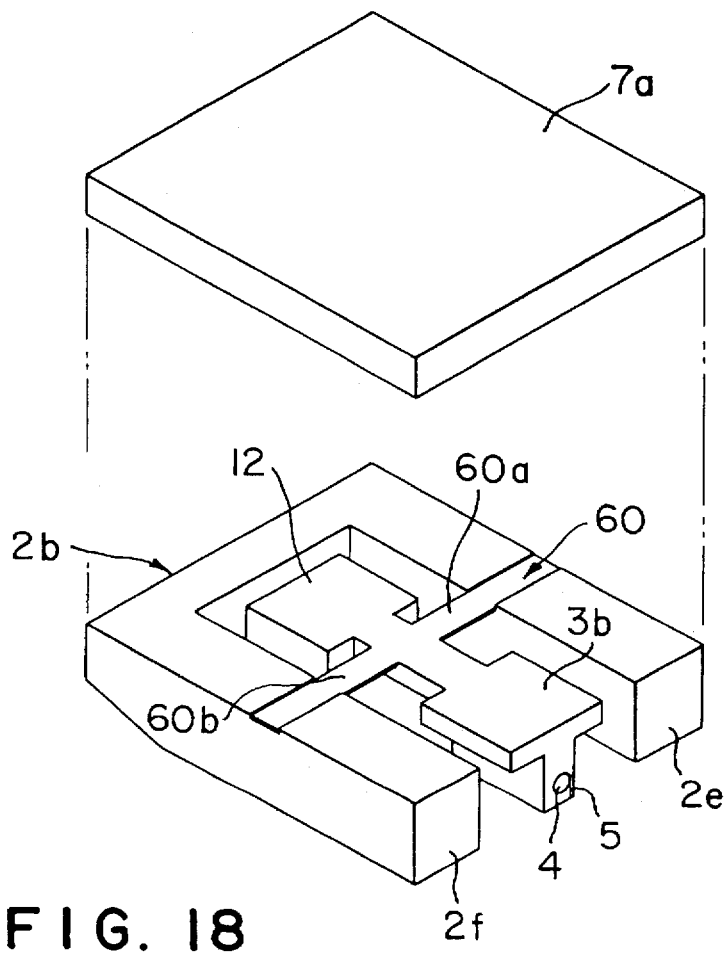
FIG. 18 is a perspective view showing the third embodiment of the recording and reproducing head slider according to the present invention.

In addition, as shown in FIG. 17, a second gap 8b is formed between a reinforcing plate 7a and the counter weight 12 in parallel to a magnetic disk. Further, a second electrode 9b is interposed in this second air gap 8b between the reinforcing plate 7 and the air gap 8b.

The construction of the third embodiment provides the following effect in addition to that obtained in the second embodiment: since the gravity center of the sum total mass of the subsidiary slider 3b and the counter weight 12 is roughly located at the connection portion of the connecting beams 60a and 60b, even if an external disturbance is applied to the recording and reproducing apparatus, it is possible to prevent the contact force between the contact end 5 and the magnetic disk from being fluctuated.

Further, since the second air gap 8b is formed over the counter weight 12 in such a way that the air gap distance can be controlled by an electrostatic force in the some way as with the case of the first air gap 8(8a), it is possible to control the contact force between the contact end 5 and the magnetic disk 101 in cooperation with the first air gap 8(8a).

Further, a suction force can be generated when one of the air gaps is charged to a pole different from that of the other air gap and since a repellent force can be generated when the two air gaps are charged to the same pole. It is thus possible to well balance the subsidiary slider 3b and the counter weight 12 in accordance with roughly linear characteristics. This is because, even if one of the air gap distances increases and thereby the force does not increase sharply due to an increase in charge, the other of the air gap distances decreases and thereby the force increases sharply due to an increase in charge. In other words, the non-linearity of the relationship between the applied voltage and the generated contact force can be reduced, the control can be facilitated to that extent. In particular, when only the suction force is controlled, it is possible to facilitate the control.

Figure 19:
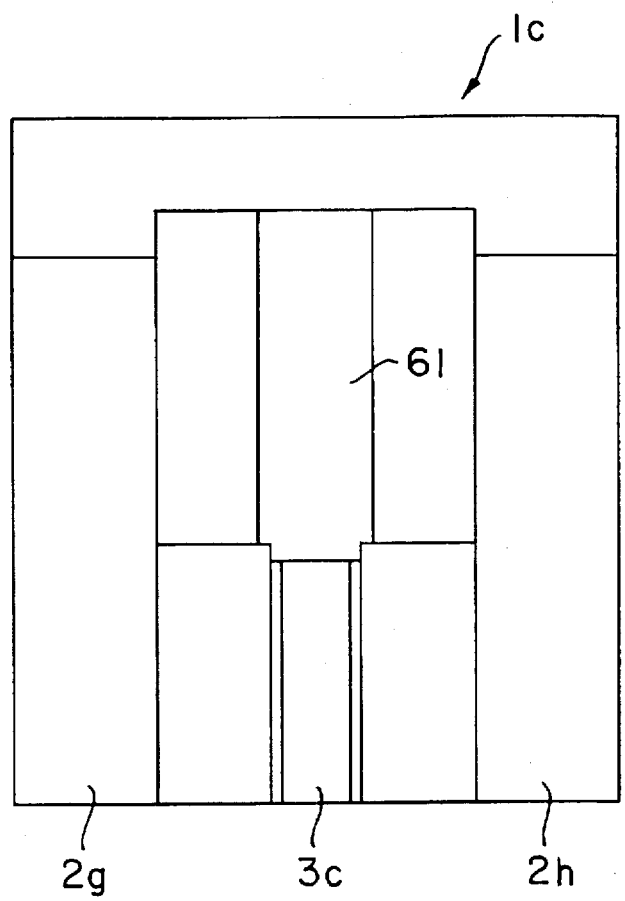
FIG. 19 is a back view showing a fourth embodiment of the recording and reproducing head slider according to the present invention.

A fourth embodiment of the magnetic head slider according to the present invention will be described hereinbelow with reference to FIGS. 19 to 21.

In the first embodiment, the main slider 2, the subsidiary slider 3, and the connecting beam 6 are all formed integral with each other by use of a silicon semiconductor, for instance. In contrast with this, in this fourth embodiment, only a subsidiary slider 3c, a connecting beam 61, and a junction member 13 are formed integral with each other by use of a silicon semiconductor, for instance. On the other hand, main sliders 2g and 2h are formed of a material, such as an alloy including aluminum, different from that of the other members and joined with the junction member 13 by means of diffusion junction.

Figure 20:
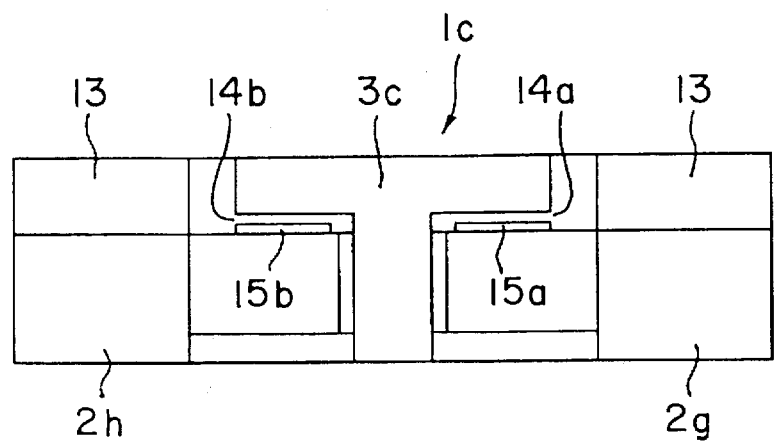
FIG. 20 is a cross-sectional view showing the fourth embodiment of the recording and reproducing head slider according to the present invention.
Figure 21:
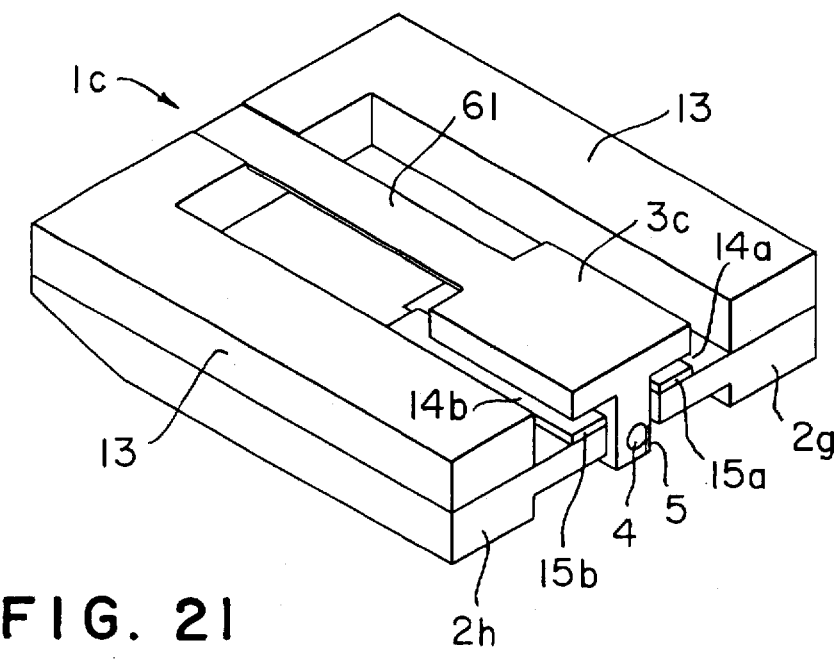
FIG. 21 is a perspective view showing the fourth embodiment of the recording and reproducing head slider according to the present invention.

In the two sliders 2g and 2h for constituting the main slider of this embodiment, two air flow outgoing ends of the main slider project in the mutually confronting direction in such a way that the two end portions of the main slider face two side lower surfaces of an upper portion of a T-shaped subsidiary slider 3c, as depicted in FIG. 20. Two air gaps 14a and 14b are formed at the two opposing portions between the ends of the two sliders 2g and 2h and the subsidiary slider 3c.

Further, two electrodes 15a and 15b are fixed to the two end portions of the sliders 2g and 2h, respectively within the two air gaps 14a and 14b, separately.

The construction of the fourth embodiment provides the following effect in addition to that obtained in the first embodiment: since the main slider can be manufactured in accordance with a manufacturing process different from that of the recording and reproducing head 4 and the contact end 5, it is possible to improve the characteristics of the recording and reproducing head slider by adopting the most appropriate manufacturing method for the head slider.

Figure 22:
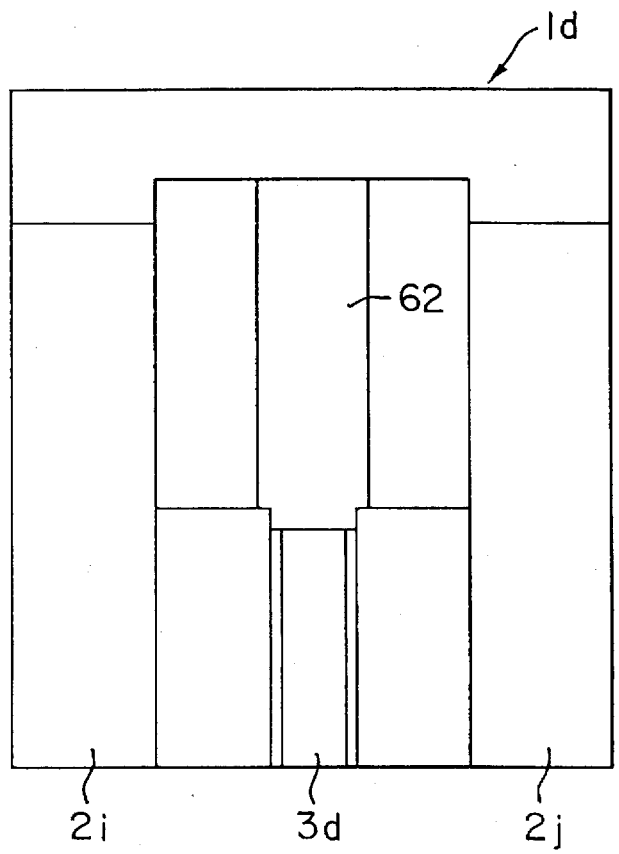
FIG. 22 is a back view showing a fifth embodiment of the recording and reproducing head slider according to the present invention.
Figure 23:
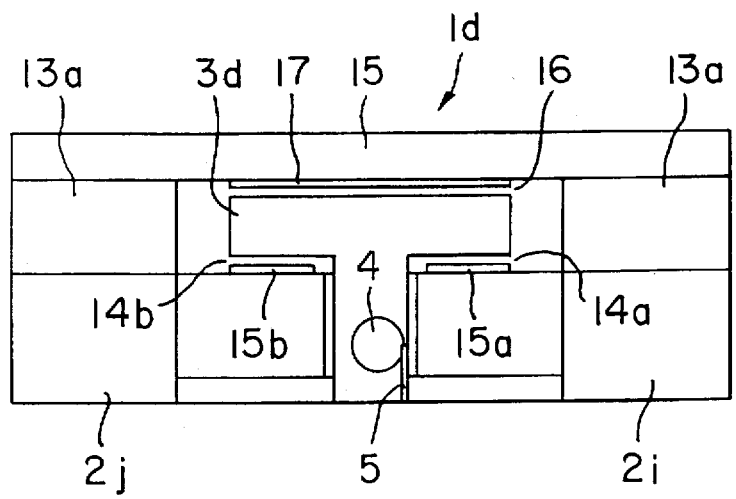
FIG. 23 is a cross-sectional view showing the fifth embodiment of the recording and reproducing head slider according to the present invention.
Figure 24:
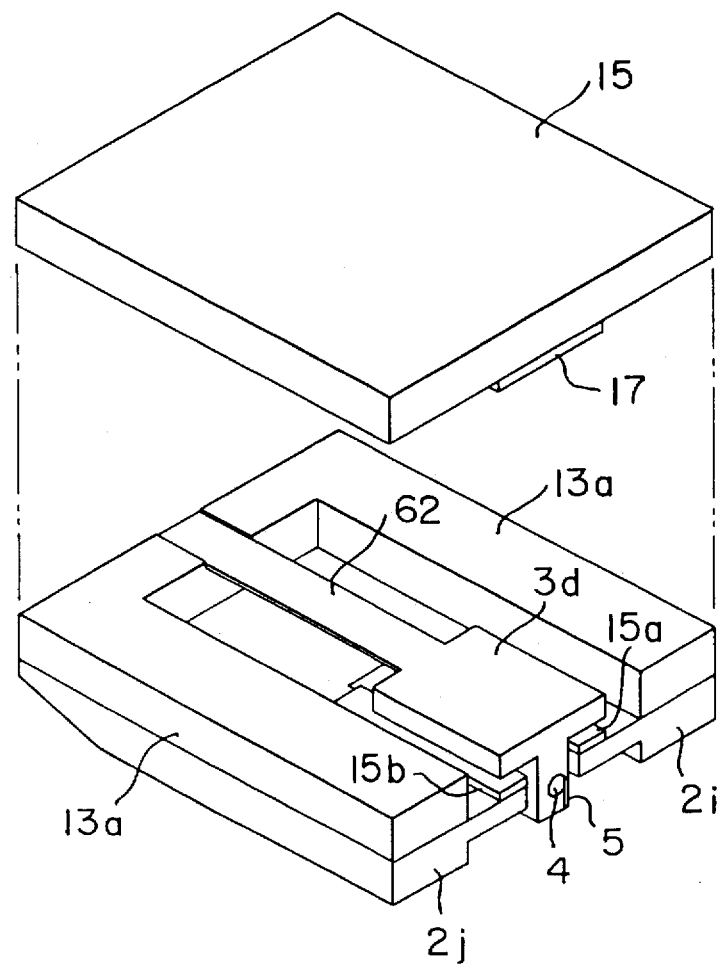
FIG. 24 is a perspective view showing the fifth embodiment of the recording and reproducing head slider according to the present invention.

A fifth embodiment of the magnetic head slider according to the present invention will be described hereinbelow with reference to FIGS. 22 to 24.

This fifth embodiment is different from the fourth embodiment in that a reinforcing plate 15 is additionally provided on the upper surface of a junction member 13a.

Therefore, a third air gap 16 can be formed between the reinforcing plate 15 and a subsidiary slider 3d in parallel to a magnetic disk. Further, another electrode 17 is disposed within this third air gap 16 in such a way that it is fixed in the air gap 16 of the reinforcing plate 15.

In the construction of the fifth embodiment, since an urging force can be generated in cooperation with both a first air gap 8 and the third air gap 16, in the same way as with the positional relationship between the two air gaps 8a and 8b explained in the third embodiment, it is possible to control the contact force between the contact end 5 and a magnetic disk appropriately. In addition, since the non-linearity characteristics of the relationship between the applied voltage and the generated contact force can be reduced, it is possible to facilitate the control operation.

Preferred embodiments of the magnetic head slider according to the present invention have been described hereinabove by way of examples. Without being limited only thereto, however, various modifications can be made without departing the gist of the present invention.

For instance, in the above-mentioned embodiments, although the magnetic disk is located and driven by a rotary actuator, without being limited only thereto, the similar effects can be obtained when the present invention is applied to another magnetic disk located and driven by a linear actuator, for instance.

Further, in the above-mentioned embodiments, although the magnetic head slider has been explained as an example of the recording and reproducing head slider and further the magnetic disk apparatus has been explained as an example of the recording and reproducing apparatus, without being limited only thereto, the present invention can be applied to another recording and reproducing apparatus such as an optical data recording and reproducing apparatus.

As described above, in the head slider according to the present invention, the air gap distance formed between the subsidiary slider and the reinforcing plate can be detected by measuring the electrostatic capacity interposed within the air gap. In addition, it is possible to change the contact force and the gap distance between the recording and reproducing head and the data recording medium by controlling the voltage applied to the electrode according to the detected air gap distance.

As a result, it is possible to provide the recording and reproducing head slider which can stably maintain the contact condition between the recording and reproducing head and the recording medium, by controlling the voltage applied to the electrode according to the air gap distance, while suppressing the contact force between the head slider and the recording medium as small as possible.

What is claimed is:

1. A recording and reproducing head slider having a recording and reproducing head for recording and reproducing data in and from a data recording medium, comprising:

a first slider floated by a hydrodynamic force generated by the data recording medium while rotating;

a second slider elastically supported by the first slider so as to be displaced in a plane direction of the data recording medium, the recording and reproducing head being mounted on the second slider;

force generating means, facing the second slider via a gap, for generating a repellent force between the force generating means and the second slider;

means for measuring an electrostatic capacity of said gap; and means for varying said gap in accordance with the measured electrostatic capacity of said gap.

2. The recording and reproducing head slider of claim 1, wherein the first slider has two slider rails provided parallel to each other.

3. The recording and reproducing head slider of claim 2, further comprising a plate fixed on the two slider rails so that the two slider rails are situated in a same plane with respect to the data recording medium.

4. The recording and reproducing head slider of claim 2, further comprising a connecting portion for connecting the second slider to the first slider so that the second slider is elastically supported by the first slider.

5. The recording and reproducing head slider of claim 4, further comprising a counter weight provided on a side opposite to the second slider with respect to the connecting portion so that a gravity center of a sum total mass of the second slider and the counterweight is located on the connecting portion.

6. A recording and reproducing apparatus for recording and reproducing data in and from a data recording medium, comprising:

a first slider floated by a hydrodynamic force generated by the data recording medium while rotating;

a second slider elastically supported by the first slider so as to be displaced in a plane direction of the data recording medium;

a recording and reproducing head mounted on the second slider;

drive means for driving the first and second sliders so that the recording and reproducing head is floated over the data recording medium;

force generating means, facing the second slider via a gap, for generating a repellent force between the force generating means and the second slider;

means for measuring an electrostatic capacity of said gap; and means for varying said gap in accordance with the measured electrostatic capacity of said gap.

7. The recording and reproducing apparatus of claim 6, wherein the first slider has two slider rails provided parallel to each other.

8. The recording and reproducing apparatus of claim 7, further comprising a plate fixed on the two slider rails so that the two slider rails are situated in a same plane with respect to the data recording medium.

9. The recording and reproducing apparatus of claim 7, further comprising a connecting portion for connecting the second slider to the first slider so that the second slider is elastically supported by the first slider.

10. The recording and reproducing apparatus of claim 9, further comprising a counter weight provided on a side opposite to the second slider with respect to the connecting portion so that a gravity center of a sum total mass of the second slider and counterweight is located on the connecting portion.

* * * * *